(12) United States Patent
Smith et al.

(10) Patent No.: US 8,403,154 B2
(45) Date of Patent: *Mar. 26, 2013

(54) CABLE MANAGEMENT ASSEMBLY, SYSTEM AND METHOD

(75) Inventors: Trevor D. Smith, Eden Prairie, MN (US); James J. Solheid, Lakeville, MN (US); Timothy J. Haataja, Prior Lake, MN (US); Michael J. Wentworth, Belle Plaine, MN (US); David E. Rapp, Eden Prairie, MN (US); Michael Jay Follingstad, Prior Lake, MN (US); Michael John Shorter, Lonsdale, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/352,039

(22) Filed: Jan. 17, 2012

(65) Prior Publication Data

US 2012/0111809 A1      May 10, 2012

Related U.S. Application Data

(60) Continuation of application No. 12/803,554, filed on Jun. 28, 2010, now Pat. No. 8,127,941, which is a continuation of application No. 12/380,287, filed on Feb. 25, 2009, now Pat. No. 7,748,541, which is a continuation of application No. 11/998,169, filed on (Continued)

(51) Int. Cl.
*A47F 7/00* (2006.01)
(52) U.S. Cl. .................................... 211/26.2
(58) Field of Classification Search ............... 211/26.2, 211/192, 26, 191, 59.1, 85.5, 103, 187, 207, 211/190, 106.01; 248/220.31, 220.41, 220.42, 248/220.43, 222.11, 222.12, 222.14, 222.51, 248/222.52; 361/826

See application file for complete search history.

(56) References Cited

U.S. PATENT DOCUMENTS

| | | | |
|---|---|---|---|
| 693,127 | A | 2/1902 | Gardner et al. |
| 1,751,463 | A | 3/1930 | Clayton et al. |
| 2,814,894 | A | 12/1957 | Horton |
| 2,913,210 | A | 11/1959 | Tichnor |
| 3,159,368 | A | 12/1964 | Ahlbin et al. |
| 3,204,776 | A | 9/1965 | Brown et al. |
| 3,315,816 | A | 4/1967 | Mallory |
| 3,388,806 | A | 6/1968 | Cunningham et al. |

(Continued)

FOREIGN PATENT DOCUMENTS

| | | |
|---|---|---|
| EP | 1 160 605 A2 | 5/2001 |
| FR | 2 701 345 A1 | 8/1994 |

(Continued)

OTHER PUBLICATIONS

Exhibit A, "Next Generation Frame (NGF) Product Family Ordering Guide," *ADC Telecommunications, Inc.*, 2 pages, Copyright 1998.

(Continued)

*Primary Examiner* — Jennifer E. Novosad
(74) *Attorney, Agent, or Firm* — Merchant & Gould P.C.

(57) ABSTRACT

A cable management assembly, and method related thereto, including a riser panel having an interface portion and a plurality of cable management devices. The interface portion having a plurality of shaped apertures. The cable management devices having attachments that correspond to the shaped apertures to secure the cable management devices to the panel at selected vertical and horizontal locations. The cable management assembly being configured to extend between two adjacent telecommunications racks or to couple to the end of a telecommunications rack.

6 Claims, 16 Drawing Sheets

Related U.S. Application Data

Nov. 27, 2007, now Pat. No. 7,513,374, which is a continuation of application No. 11/450,191, filed on Jun. 8, 2006, now Pat. No. 7,331,473, which is a division of application No. 10/295,169, filed on Nov. 15, 2002, now Pat. No. 7,083,051.

(56) References Cited

U.S. PATENT DOCUMENTS

| | | |
|---|---|---|
| 3,420,482 A | 1/1969 | Taylor |
| 3,512,653 A | 5/1970 | Erismann |
| 3,516,552 A | 6/1970 | Salava |
| 3,944,176 A | 3/1976 | Danko |
| 3,986,318 A | 10/1976 | McConnell |
| 4,303,217 A | 12/1981 | Garfinkle |
| 4,405,108 A | 9/1983 | Muirhead |
| 4,441,619 A | 4/1984 | Gibitz |
| 4,527,760 A | 7/1985 | Salacuse |
| 4,619,428 A | 10/1986 | Bailey |
| 4,681,233 A | 7/1987 | Roth |
| 4,768,660 A | 9/1988 | Handler et al. |
| 5,080,310 A | 1/1992 | Choi |
| 5,143,331 A | 9/1992 | Robert |
| 5,163,567 A | 11/1992 | Betts, Sr. |
| 5,165,640 A | 11/1992 | Williams, 3rd |
| 5,379,976 A | 1/1995 | DeGirolamo |
| 5,420,762 A | 5/1995 | Lewis |
| 5,588,631 A | 12/1996 | Yee |
| 5,640,482 A | 6/1997 | Barry et al. |
| 5,653,349 A | 8/1997 | Dana et al. |
| 5,738,020 A | 4/1998 | Correia |
| 5,758,002 A | 5/1998 | Walters |
| 5,778,130 A | 7/1998 | Walters et al. |
| 5,785,187 A | 7/1998 | Lipman et al. |
| 5,785,190 A | 7/1998 | Otema |
| 5,791,502 A | 8/1998 | Bietz et al. |
| 5,930,972 A | 8/1999 | Benner et al. |
| 6,003,685 A | 12/1999 | Malin |
| 6,115,977 A | 9/2000 | Hornberger et al. |
| 6,123,400 A | 9/2000 | Nicolai et al. |
| 6,129,316 A | 10/2000 | Bauer |
| 6,131,347 A | 10/2000 | Hornberger et al. |
| 6,170,673 B1 | 1/2001 | Nicolai |
| 6,189,847 B1 | 2/2001 | Hart |
| 6,193,198 B1 | 2/2001 | Baur et al. |
| 6,238,028 B1 | 5/2001 | Benner et al. |
| 6,266,250 B1 | 7/2001 | Foye |
| 6,267,254 B1 | 7/2001 | Chen |
| 6,270,281 B1 | 8/2001 | Ruusuvuori |
| 6,282,854 B1 | 9/2001 | Vos et al. |
| 6,289,618 B1 | 9/2001 | Kump et al. |
| 6,352,164 B1 | 3/2002 | Hyatte et al. |
| 6,363,198 B1 | 3/2002 | Braga et al. |
| 6,397,533 B1 | 6/2002 | Hornberger et al. |
| 6,398,149 B1 | 6/2002 | Hines et al. |
| 6,405,984 B1 | 6/2002 | Simons et al. |
| 6,423,898 B1 | 7/2002 | Croker |
| 6,443,320 B1 | 9/2002 | Herzog et al. |
| 6,468,112 B1 | 10/2002 | Follingstad et al. |
| 6,481,583 B1 | 11/2002 | Black et al. |
| D467,793 S | 12/2002 | Zadak |
| D469,003 S | 1/2003 | Valiulis |
| 6,516,955 B1 | 2/2003 | Dudhwala et al. |
| 6,581,788 B1 | 6/2003 | Winig et al. |
| 6,584,267 B1 | 6/2003 | Caveney et al. |
| 6,595,379 B1 | 7/2003 | Powell |
| 6,659,295 B1 | 12/2003 | De Land et al. |
| 6,684,583 B2 | 2/2004 | Hodges et al. |
| 7,070,021 B1 | 7/2006 | McKinney |
| 7,083,051 B2 | 8/2006 | Smith et al. |
| 7,219,808 B2 | 5/2007 | Wright et al. |
| 7,331,473 B2 | 2/2008 | Smith et al. |
| 7,513,374 B2 | 4/2009 | Smith et al. |
| 7,677,400 B2 | 3/2010 | Bayazit et al. |
| 7,748,541 B2 | 7/2010 | Smith et al. |
| 2002/0037193 A1 | 3/2002 | Gibbons et al. |
| 2004/0094491 A1 | 5/2004 | Smith et al. |
| 2006/0171651 A1 | 8/2006 | Laursen |
| 2010/0193450 A1 | 8/2010 | Bayazit et al. |

FOREIGN PATENT DOCUMENTS

| | | |
|---|---|---|
| WO | WO 01/01534 A1 | 1/2001 |
| WO | WO 02/052866 A2 | 7/2002 |

OTHER PUBLICATIONS

Exhibit B, "Fiber Panel Products, Second Edition," *ADC Telecommunications, Inc.*, 3 pages, Copyright 1994, 1996.

Exhibit C, "Fiber Cable Management Products, Third Edition," *ADC Telecommunications, Inc.*, 8 pages, Copyright 1995, 1998.

Exhibit D, "Value-Added Module System," *ADC Telecommunications, Inc.*, 2 pages, Copyright 1993, 1994, 1998.

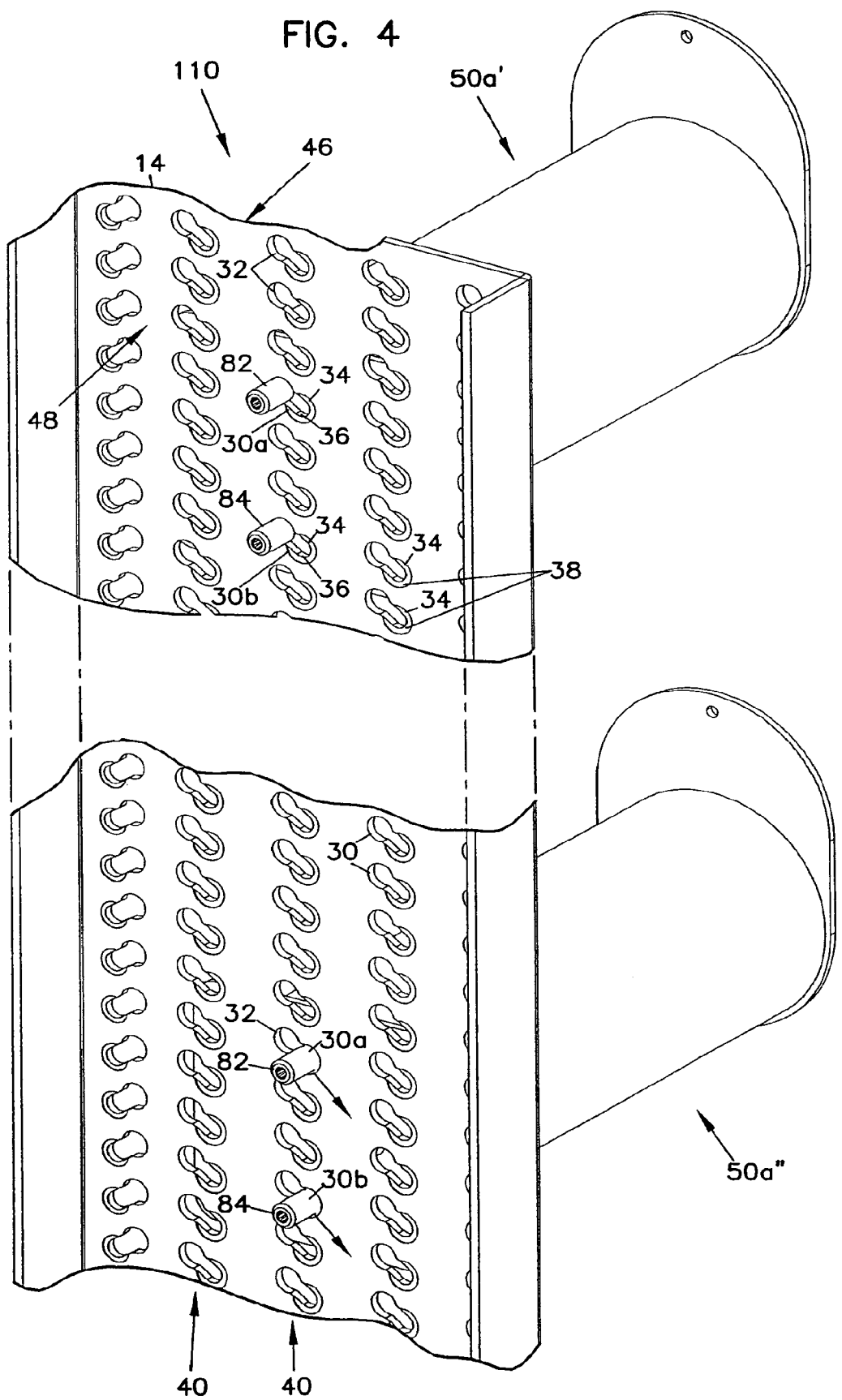

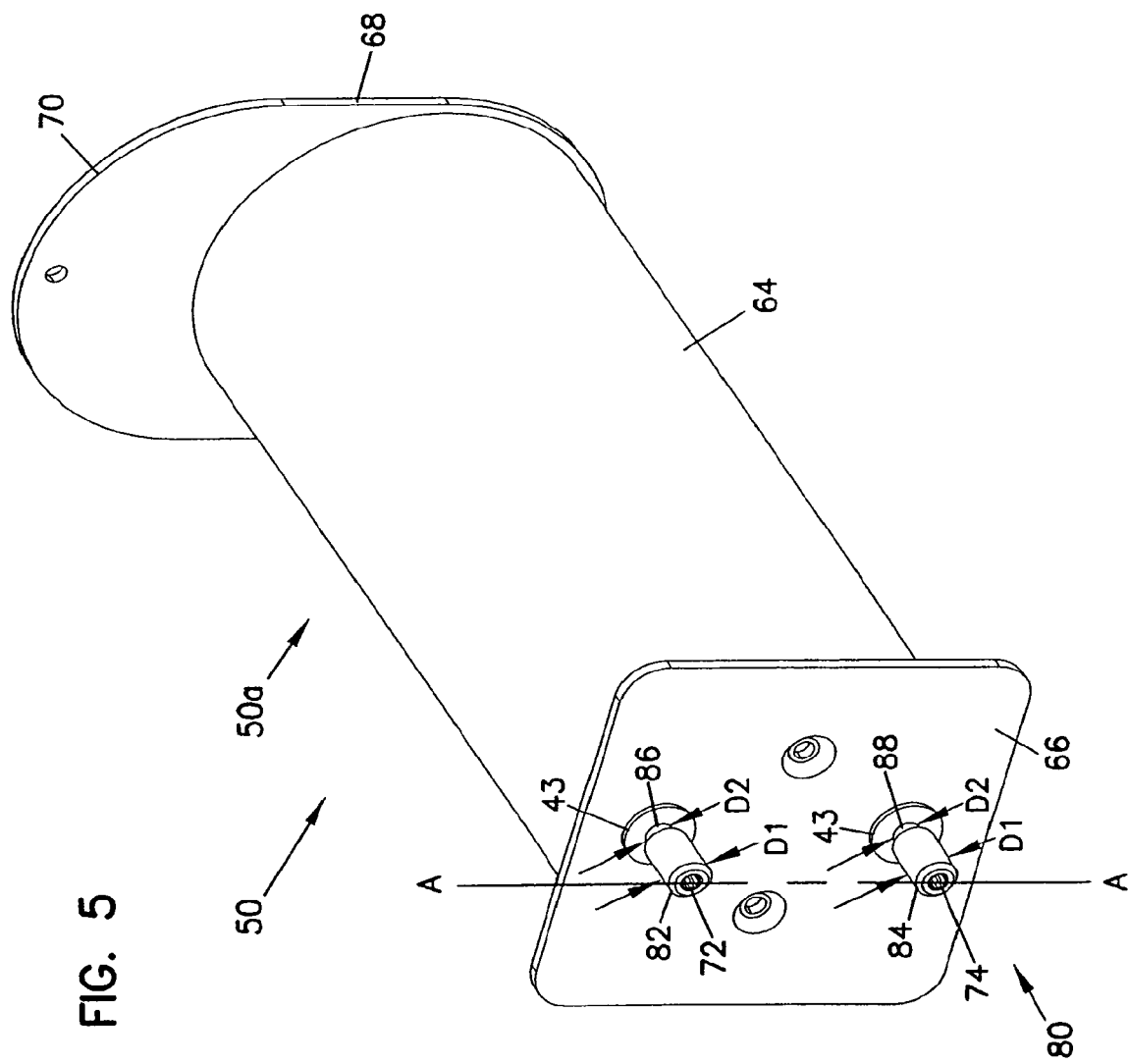

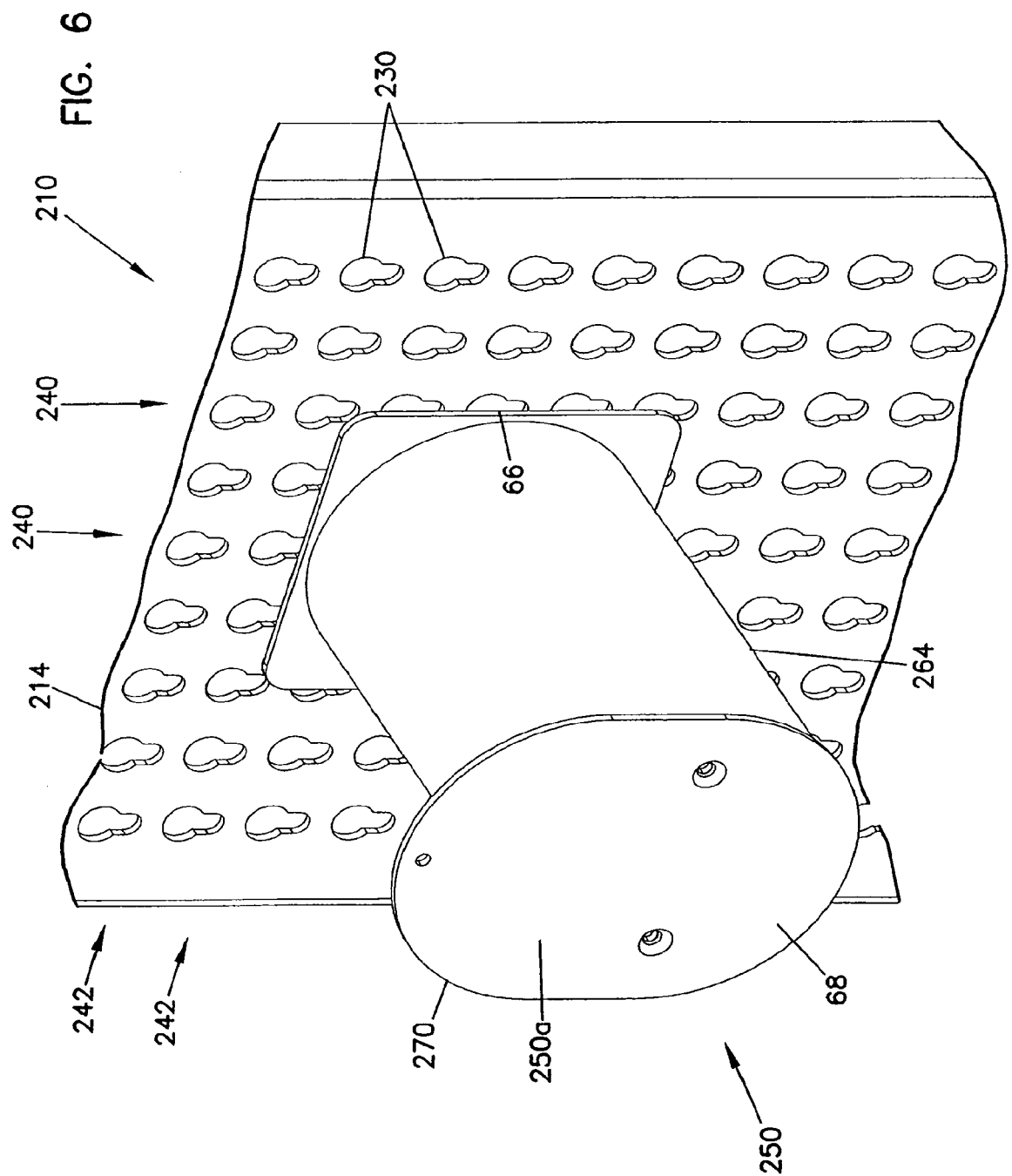

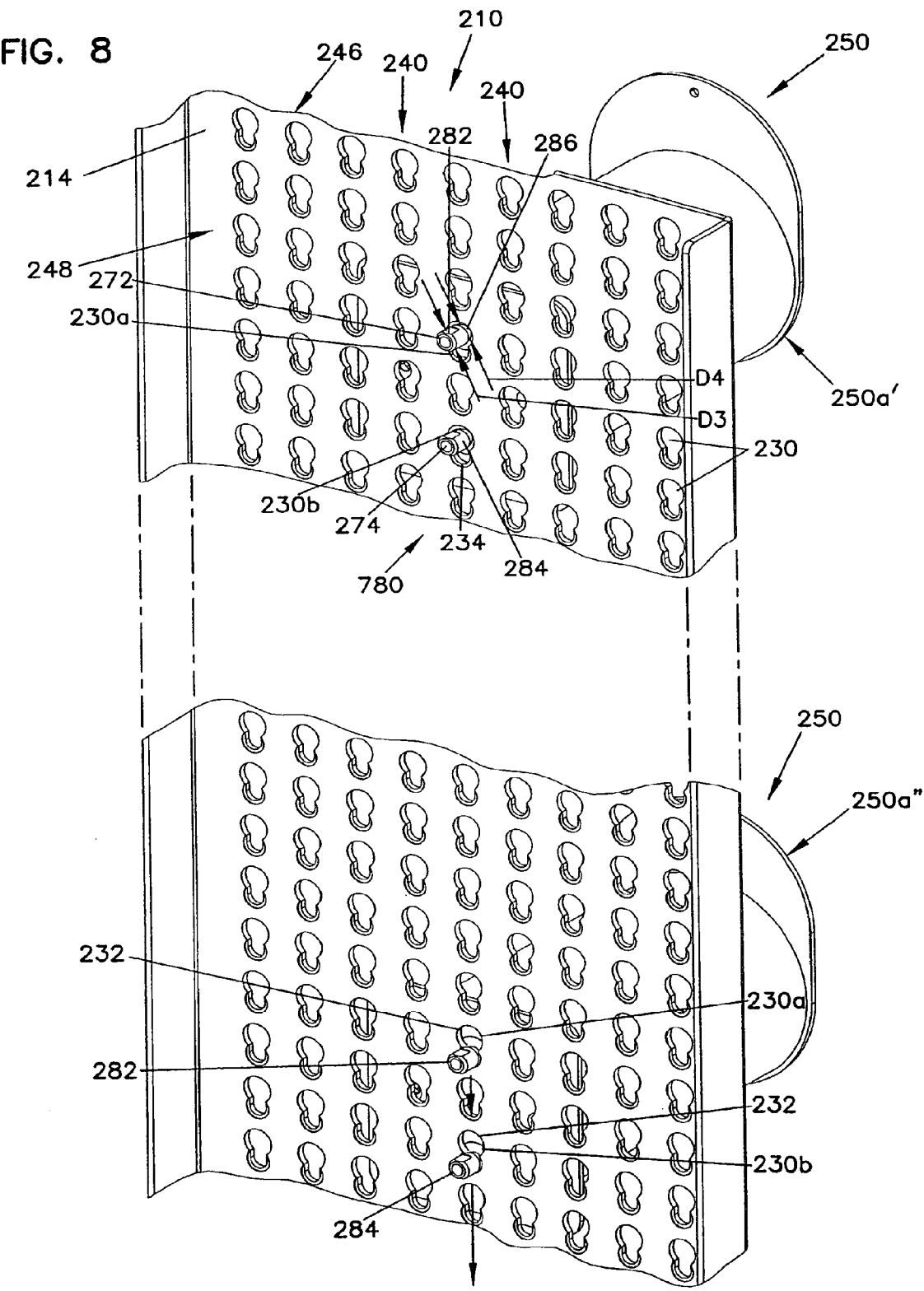

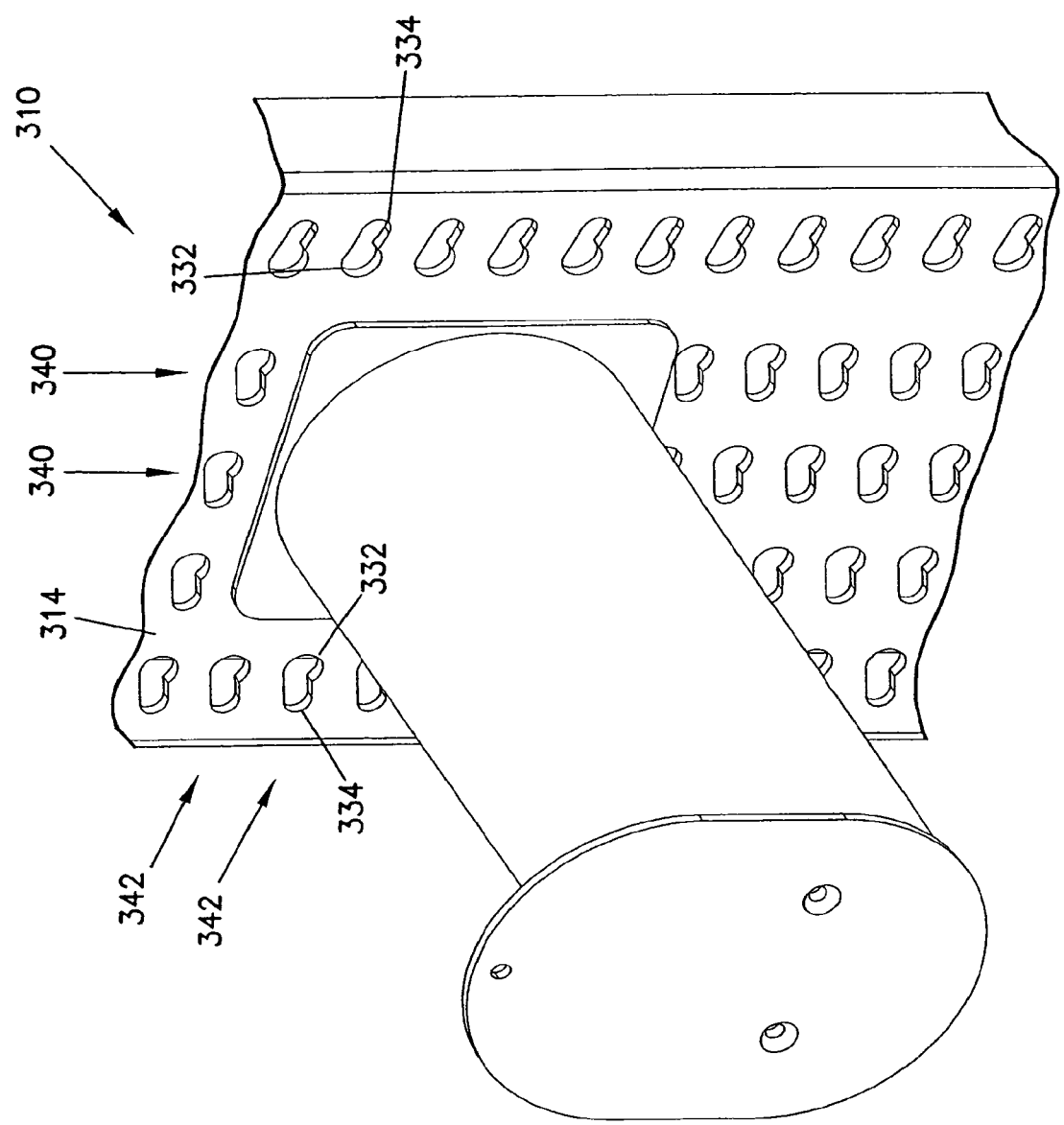

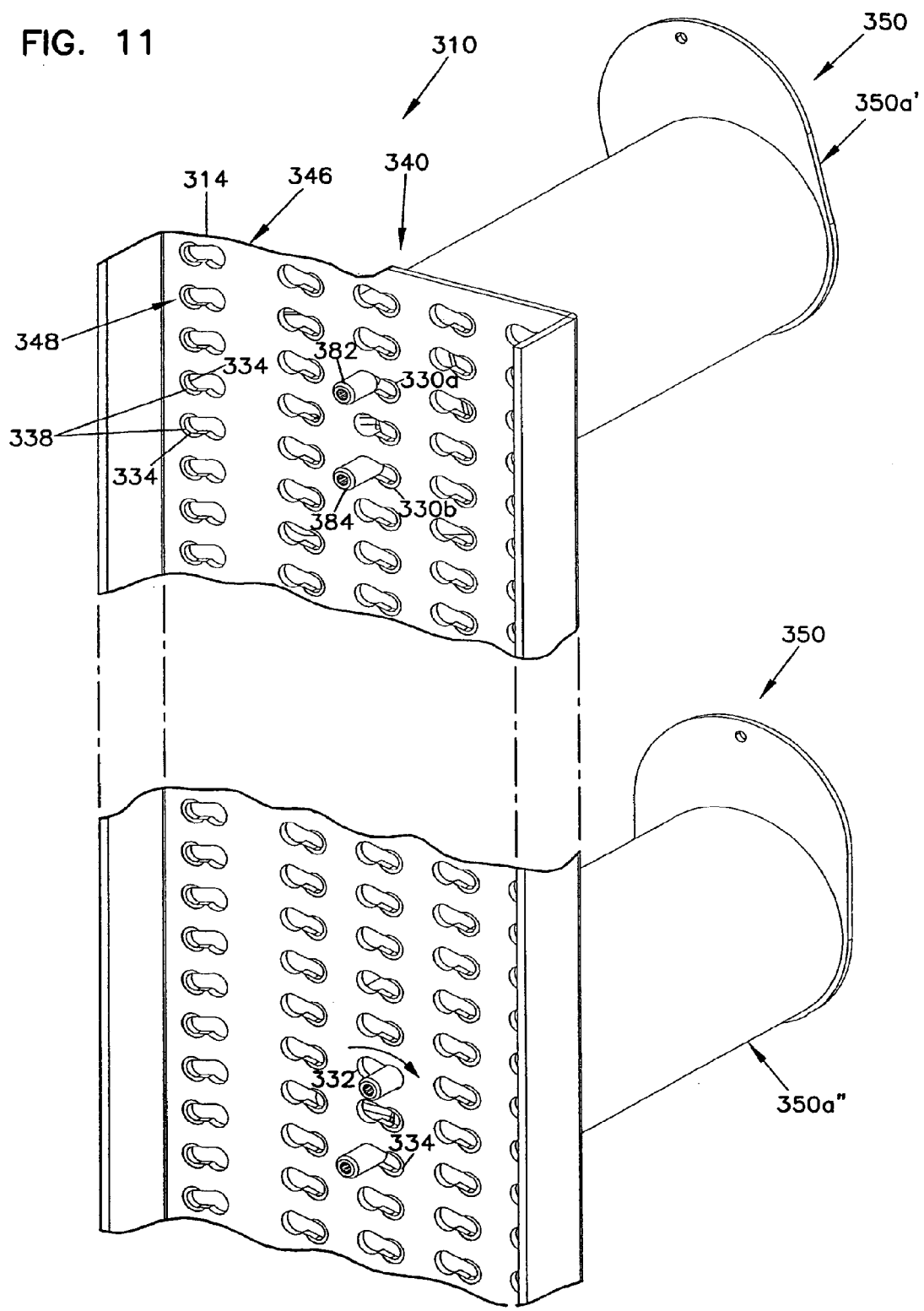

CABLE MANAGEMENT ASSEMBLY, SYSTEM AND METHOD

CROSS-REFERENCE TO RELATED APPLICATIONS

This application is a continuation of application Ser. No. 12/803,554, filed Jun. 28, 2010, now U.S. Pat. No. 8,127,941, which is a continuation of application Ser. No. 12/380,287, filed Feb. 25, 2009, now U.S. Pat. No. 7,748,541, which is a continuation of application Ser. No. 11/998,169 filed Nov. 27, 2007, now U.S. Pat. No. 7,513,374, which is a continuation of application Ser. No. 11/450,191, filed Jun. 8, 2006, now U.S. Pat. No. 7,331,473, which is a divisional of application Ser. No. 10/295,169, filed Nov. 15, 2002, now U.S. Pat. No. 7,083,051, which applications are incorporated herein by reference in their entirety.

TECHNICAL FIELD

The present invention relates generally to devices and methods for enhancing cable management of a telecommunications system. More particularly, the present invention relates to a cable management panel for use in telecommunications systems.

BACKGROUND

Telecommunications systems commonly include cables (e.g., fiber optic cables or copper twisted pair cables) for interconnecting pieces of telecommunications equipment. Telecommunications racks typically hold a variety of different pieces of telecommunications equipment. Often thousands of cables are used to interconnect the various pieces of telecommunications equipment mounted on the racks.

Because of the large number of cables associated with telecommunications equipment, cable management is crucial. Cable management involves efficiently routing cables to minimize the space occupied by such cables. Cable management also involves routing cables in an orderly manner so as to reduce the likelihood of cable tangling. Ease of cable organization is also a factor related to effective cable management.

Cable management is also important in preventing damage to the cables. Unnecessary or excessive displacement of fiber optic cables, for example, is undesirable. As the fiber optic cables are displaced, they are subject to bending and other forces. Bending of the fibers can cause attenuation and loss of signal strength. As the fiber bends, the fiber can also break, resulting in a loss of transmission through the fiber.

In general, cable management improvement has been sought, generally to efficiently and effectively manage cables by providing system adaptability, and ease of cable organization.

SUMMARY

One aspect of the present invention relates to a cable management assembly including a panel having a plurality of shaped apertures and a plurality of cable management devices. The cable management device includes attachments corresponding to the shaped apertures that secure the cable management devices to the panel at selected horizontal and vertical locations.

Another aspect of the present invention relates to a telecommunications cable management system including at least a first telecommunication rack and the cable management assembly. The cable management assembly can extend between adjacent telecommunication racks and include a first interface plane, or connect to an end of a telecommunications rack and include first, second and third interface planes.

Yet another aspect of the present invention relates to a cable management assembly including a panel having a plurality of discrete openings. Cable management devices of the assembly have protrusions that connect to the panel by insertion of the protrusions into the discrete openings from one side of the panel.

Still another aspect of the present invention relates to a method of assembling a cable management system including selecting a cable management device from a plurality of devices, selecting a placement coordinate along a panel, and securing the selected cable management device to the panel.

A variety of aspects of the invention are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are exemplary and explanatory only, and are not restrictive of the claimed invention.

BRIEF DESCRIPTION OF THE DRAWINGS

FIG. 4 is an enlarged rear perspective view of the cable management assembly shown in FIG. 2;

FIG. 5 is a rear perspective view of one embodiment of a cable management device shown in FIG. 2;

FIG. 6 is an enlarged front perspective view of another embodiment of a cable management assembly shown in FIG. 1;

FIG. 8 is an enlarged rear perspective view of the cable management assembly shown in FIG. 6;

FIG. 9 is an enlarged front perspective view of still another embodiment of a cable management assembly shown in FIG. 1;

FIG. 11 is an enlarged rear perspective view of the cable management assembly shown in FIG. 9;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
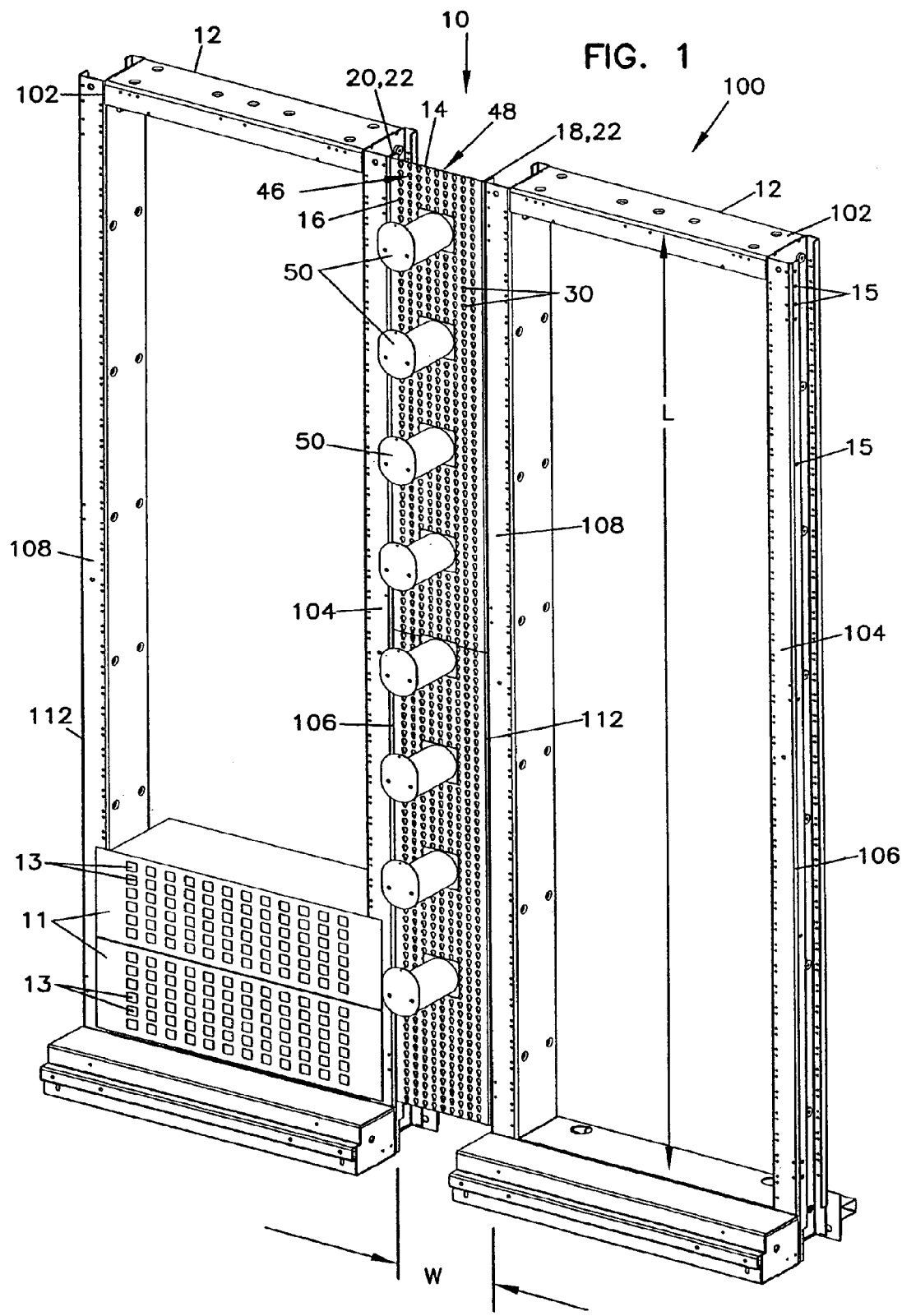
FIG. 1 is a front perspective view of one embodiment of a cable management system in accord with the principles of the present disclosure.

One embodiment of a telecommunications system 100 for managing cables interconnected to telecommunications components is illustrated in FIG. 1. The telecommunication system 100 includes a cable management assembly 10 in accord with the principles disclosed. Cable management assembly 10 illustrated in FIG. 1 is mounted between adjacent first and second telecommunication racks 12. In alternative embodiments, the cable management assembly 10 can be used with other telecommunication structures to manage cables. For example, the cable management assembly 10 can be mounted within a cabinet or within a termination panel.

Each of the illustrated telecommunication racks 12 of FIG. 1 generally includes a frame 102 having a first side column 104 and a second side column 108. The first side column 104 defines a first end 106 of the telecommunications rack 12 and the second side column 108 defines a second end 112 of the telecommunication rack 12.

The telecommunications racks 12 can be configured to receive a variety of telecommunications components. For example, the racks 12 can hold fiber terminations panels 11 that hold fiber optic adapters 13. Cables with terminating connectors (not shown) are connected together at the adapters 13.

The cable management assembly 10 includes a cable management structure 14. The cable management structure can be referred to as a back plane, riser, or panel. The panel 14 includes an interface portion 16 and first and second mounting structures 18, 20 configured to mount or couple the cable management assembly 10 to the adjacent telecommunications racks 12. In one embodiment, as shown in FIG. 1, first and second mounting structures 18, 20 include flanges 22 that extend generally outward from the interface portion 16. The flanges 22 can include mounting holes 23 (FIG. 2) corresponding to mounting holes 15 formed along the side columns 104, 108 of the telecommunications rack 12. Fasteners such as rivets or screws can be used to mount the panel 14 to the telecommunications racks 12.

The first interface portion 16 of the panel has a front side 46 and a back side 48. A plurality of discrete openings 30 extends through the interface portion from the front side 46 to the back side 48. Cable management devices 50 secure to the panel 14 at the discrete openings 30. The discrete openings 30 and the cable management devices 50 are configured and sized so that a user can organize and arrange cables (not shown) at various locations along the panel 14. In the preferred embodiment, the discrete openings 30 include shaped apertures 30 configured and sized for receipt of the cable management devices 50.

One feature of the present disclosure relates to cost reduction associated with fixed or custom-made cable management systems. The present cable management assembly permits a user to configure the system to a particular need. For example, in accord with the principles disclosed, a user has the flexibility to choose from a library of different cable management devices 50, each configured to secure to the riser or panel 14. The present system further provides flexibility in permitting a user to position any of the different cable management devices 50 at a plurality of locations on the panel 14 of the cable management assembly 10. In particular, the preferred panel 14 is constructed to provide a plurality of placement coordinates (i.e. vertical and horizontal locations) from which a user may choose to position the cable management devices. Thus, with this design, a user is not limited to a pre-made, fixed cable management system, which may not fit a particular need. Similarly, with this design, the user reduces or eliminates modification and customizing costs associated with reworking a system to fit the particular need.

Another feature of the present system relates to the system's adaptability and ease of use. In one embodiment, the cable management devices 50 are detachably secured to the riser or panel 14. This feature permits a user to modify a system's cable management strategy to accommodate growth or changes needed in a quickly changing industry.

Referring now to FIGS. 2-5, a first embodiment of the cable management assembly 10 is illustrated. In this first embodiment, the panel 14 includes a first embodiment of shaped apertures 30 configured to secure the cable management devices 50 to the interface portion 16 of the panel.

Figure 3:
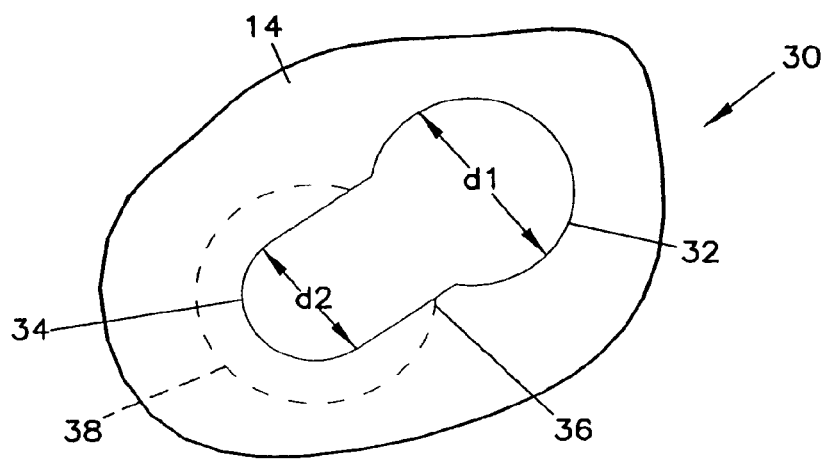
FIG. 3 is an enlarged detail view of FIG. 2.

As shown in FIG. 3, the shaped apertures 30 have a keyhole-like configuration including a first receiving aperture portion 32, a second notch aperture portion 34, and a slide aperture portion 36. The slide aperture portion 36 extends diagonally between the receiving aperture portion 32 and the notch aperture portion 34. The receiving aperture portion 32 has a first diameter d1. The notch aperture portion 34 has a second diameter d2. In this embodiment, the second diameter d2 of the notch aperture portion 34 is less than the first diameter d1 of the receiving aperture portion 32. The shaped apertures 30 are oriented and formed within the panel 14 such that the receiving aperture portion 32 is vertically located above, and laterally offset from, the notch aperture portion 34.

Referring back to FIG. 2, the shaped apertures 30 are arranged in an array of vertical columns 40 and horizontal rows 42. In this illustrated embodiment, the panel 14 includes five vertical columns 40 of shaped apertures 30. Other embodiments having more or less columns or rows of shaped apertures are contemplated. Preferably, the shaped apertures 30 are arranged in a pattern that provides a user flexibility in placing and positioning the cable management devices 50 along the panel 14. In an alternative embodiment the shaped apertures 30 may be more randomly formed in the panel 14.

Figure 2:
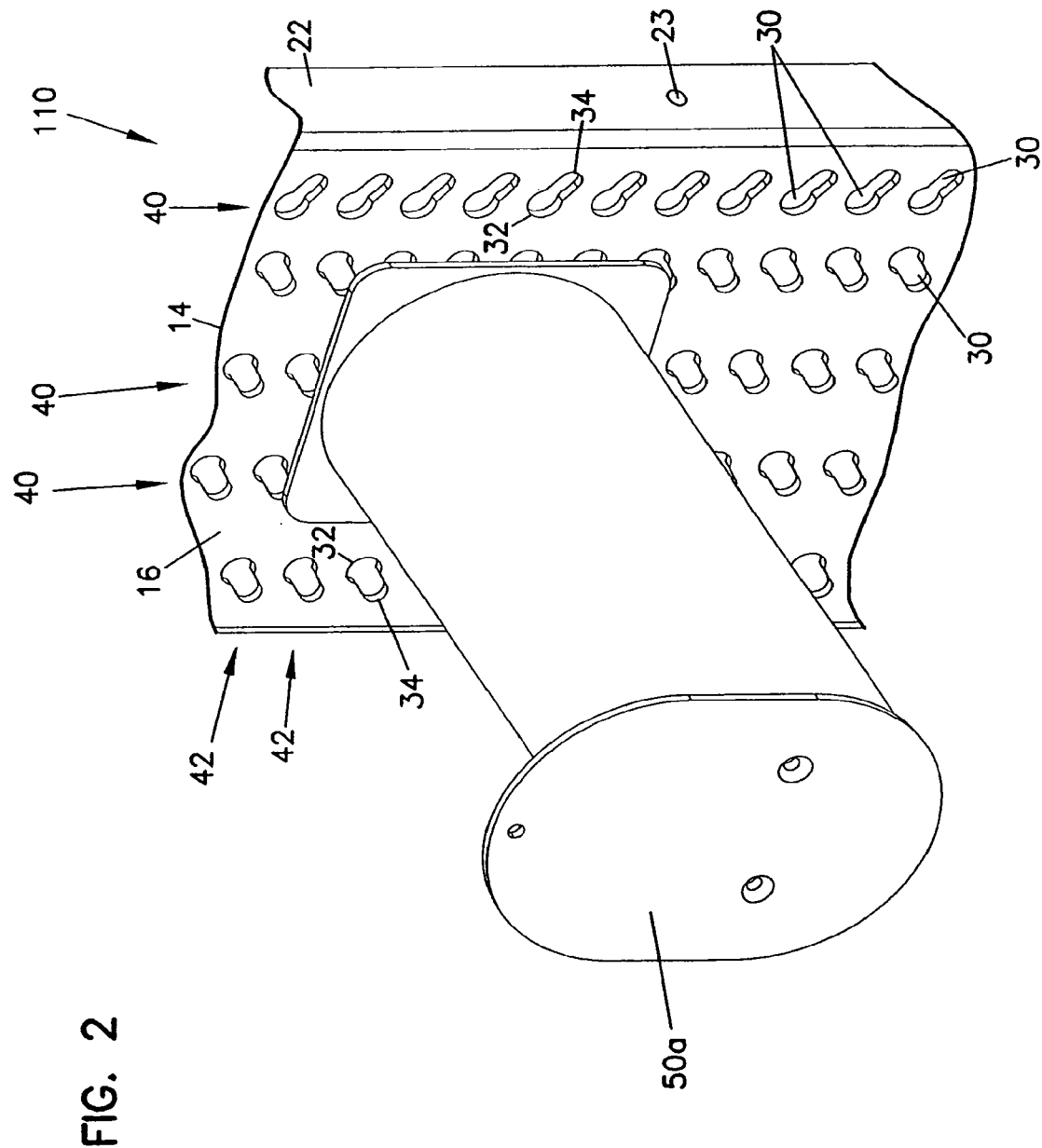
FIG. 2 is an enlarged front perspective view of one embodiment of a cable management assembly shown in FIG. 1.

Still referring to FIG. 2, the notch aperture portion 34 of the shaped apertures 30 is oriented downwardly from the receiving aperture portion 32. In viewing the embodiment in FIG. 2, the shaped apertures 30 of the most rightward vertical column 40 slants downward toward the right, from the receiving aperture portion 32 to the notch aperture portion 34. The shaped apertures 30 of the remaining four vertical columns 40 slant downward toward the left. This configuration permits a user to utilize the entire width of the panel 14 in placing and positioning cable management devices 50. As will be described in greater detail, this configuration permits installation of the cable management devices 50 on either the right-hand side of the panel or the left-hand side of the panel without interference with side columns 104, 108 (FIG. 1) of the telecommunication racks 12.

Figure 17:
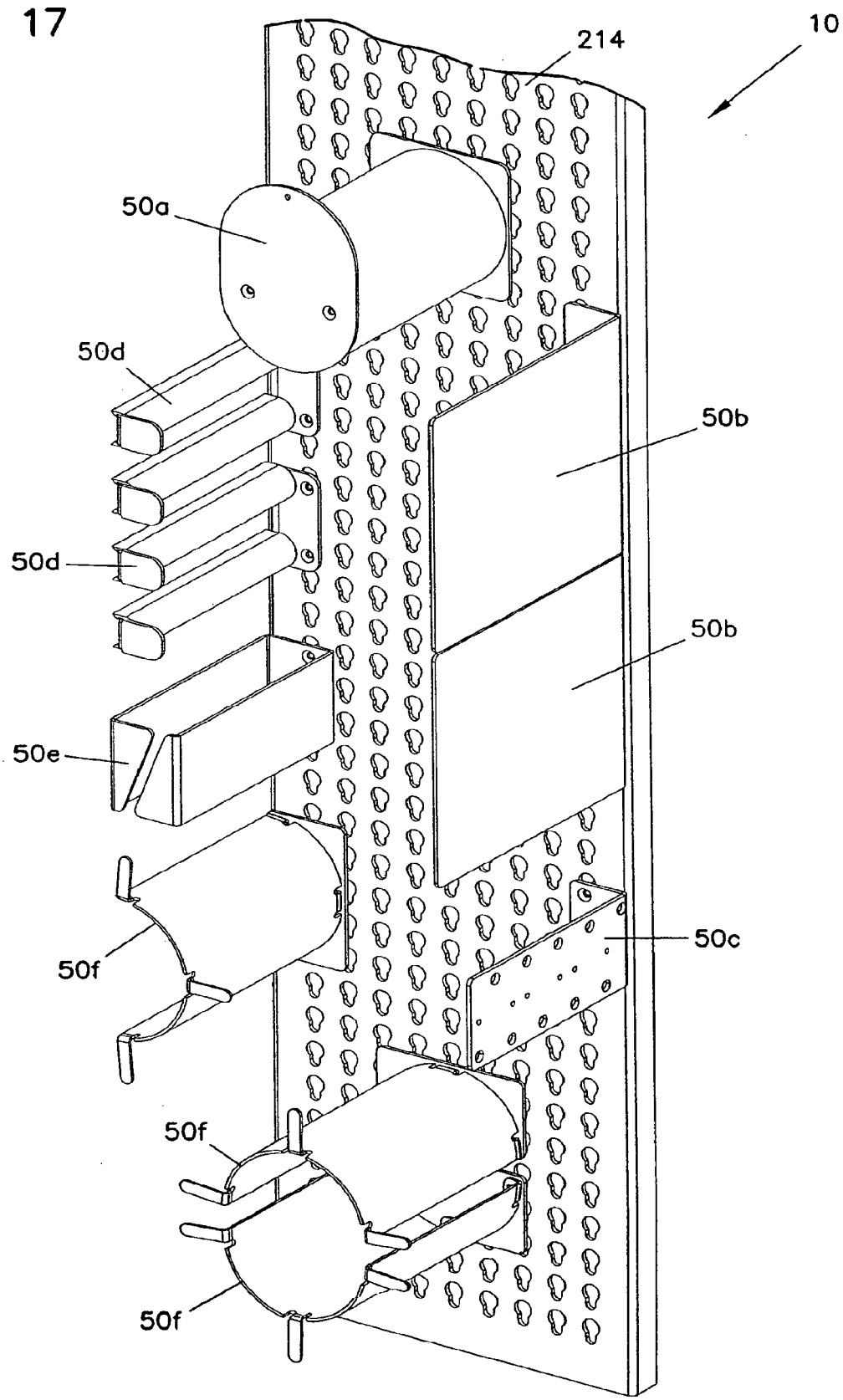
FIG. 17 is a front perspective view of the cable management assembly shown in FIG. 1, illustrating various embodiments of cable management devices.
Figure 18:
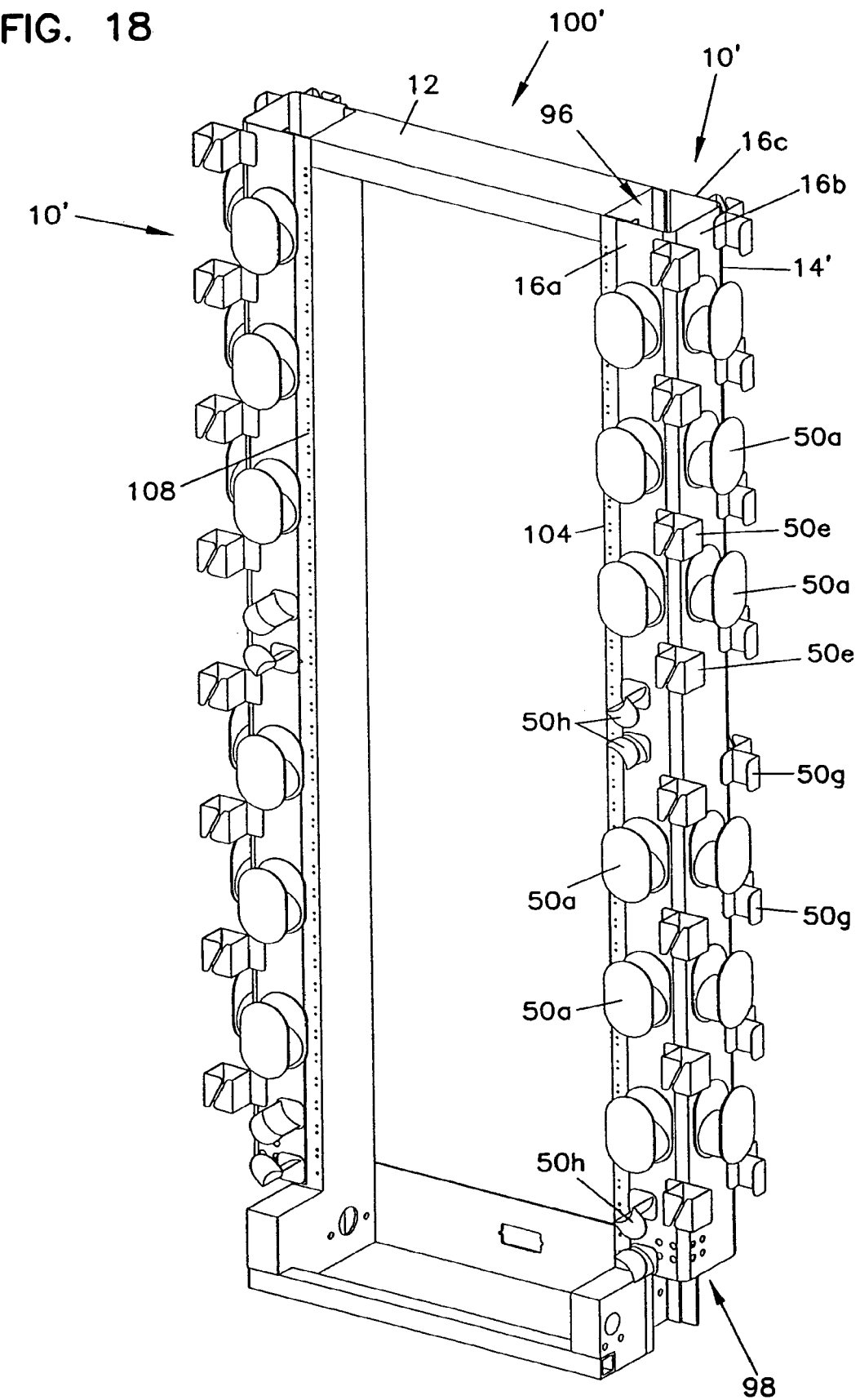
FIG. 18 is a perspective view of another embodiment of a cable management system in accord with the principles of the present disclosure.

In general, the cable management devices 50 of the present disclosure are configured to insert within any of the shaped apertures 30 to provide a variety of cable management arrangements or configurations for different applications. Exemplary cable management devices 50a-50h are shown in FIGS. 17 and 18, and will be described in greater detail hereinafter. One of the exemplary cable management devices 50, as shown in FIG. 2, is a spool 50a. It is to be understood that the spool 50a, and the other illustrated devices 50a-50h, are only examples of the variety of types of cable management devices that can be used in accord with the principles disclosed.

FIG. 5 illustrates one embodiment of the exemplary spool 50a. The spool 50a includes a spool body 64 extending between first and second ends 66, 68. A cable retainer 70 is located at the second end 68 of the spool body 64.

Each of the cable management devices 50 of the present disclosure includes a connection 80 configured to secure the device 50 to the panel 14. In the embodiment shown in FIG. 5, the connection 80 includes first and second attachments 72, 74 that correspond to the shaped apertures 30 shown in FIGS. 2 and 3. As shown, the first and second attachments 72, 74 are protrusions or pin connections 82, 84. The first and second pin connections 82, 84 each have a primary diameter D1. The primary diameter D1 of the first and second pin connections 82, 84 corresponds to the diameter d1 of the receiving aperture portions 32 of each of the shaped apertures 30.

The first pin connection 82 is positioned in vertical alignment with the second pin connection 84 (axis A-A). This positioning is advantageous on cable management devices 50 that can be used in an upward orientation and a downward orientation. That is, the arrangement of the first and second pin connections 82, 84 permits a user to secure the device 50 with the first pin connection 82 positioned towards the top of the panel 14; or turn the device one-hundred and eighty degrees and secure the device 50 with the first pin connection 82 positioned towards the bottom of the panel. It is contemplated that, in addition, the device 50 may be configured to also turn ninety degrees and secure to shaped apertures 30 within a single row, with the first pin connection 82 positioned towards either side of the panel.

Each of the first and second pin connections 82, 84 includes a neck or annular groove 86, 88. The grooves 86, 88 are located between the primary diameter D1 of the pin connections 82, 84 and the first end 66 of the spool body 64. The grooves 86, 88 have an outer diameter D2. The diameter D2 of each groove is less than the primary diameter D1, and corresponds to the diameter d2 of the notch aperture portion 34 of the shaped apertures 30.

FIG. 4 illustrates the installation of this first cable management device embodiment 50a. An upper device 50a' is shown partially mounted to the panel 14; a lower device 50a'' is shown secured to the panel 14. In use, the cable management device 50 is secured to the panel 14 by pushing or inserting the first and second pin connections 82, 84 of the device 50a' into the receiving aperture portions 32 of a selected first and second shaped aperture 30a, 30b. The cable management device is inserted into the shaped apertures 30 from the front side 46 of the panel 14 toward the back side 48 of the panel. The device 50a is then moved along the slide aperture portion 36 toward the notch aperture portion 34 (represented by the arrow) to a secured position, as illustrated by device 50b. In general, the cable management device 50 is designed to secure to the panel 14 by insertion into the panel from one side, without the use of tools or extra fastening components.

When the device 50 is translated downward along the slide aperture portion 36 toward the notch aperture portion 34, the panel 14 becomes engaged in the grooves 86, 88 of the first and second pin connections 82, 84. In other words, the cable management device 50 seats in the notch aperture portion 34, the thickness of the panel 14 being configured to fit between the primary diameter D1 of the pin connections 82, 84 and the first end 66 of the device 50. When secured in this matter, the cable management device 50 cannot be pulled or pushed out of position. Preferably the device 50 is detachably secured, i.e. can be slid or diagonally translated upward for removal.

The cable management device 50 illustrated in FIG. 5 can include a tensioning component, such as spring washers 43. In an alternative embodiment, the tensioning component can include a flexible tensioning leaf or tab 344, such as that shown in FIG. 12. The spring washer 43 and the flexible tensioning tab 344 place the pin connections 82, 84 in tension to assist in maintaining a secure engagement between the device 50 and the panel 14.

Still referring to FIG. 4, a recess 38 can be formed on the backside of the panel 14, at least partially surrounding the notch aperture portion 34 of the shaped holes 30. The recess 38 is preferably sized and configured to receive the primary diameter D1 of the pin connections 82, 84 when the cable management device 50 is secured to the panel 14. The recesses 38 assist in structurally supporting the pin connections 82, 84 of the cable management device 50.

The groove 86 of the first pin connection 82 couples with the notch aperture portion 34 of a first shaped aperture 30a, and the groove 88 of the second pin connection 84 couples with the notch aperture portion 34 of a second shaped aperture 30b, when the cable management device is secured to the panel 14. In this configuration two shaped apertures 30 are used to secure the device 50 to the panel 14. The first shaped aperture 30a is positioned above the second shaped aperture 30b in a single vertical column 40 of shaped apertures.

It is contemplated that other arrangements using shaped apertures having a spacing configuration other than above/below one another can be used in accord with the principles disclosed. For example, the pin connections 82, 84 can be oriented in horizontal alignment, rather than vertical alignment, on the first end 66 of the spool body 64 such that the connection 82, 84 secure to two shaped apertures 30 in a single horizontal row; or the pin connection 82, 84 can be laterally and vertically offset to couple to shaped apertures 30 in different columns 40 and different rows 42.

Figure 7:
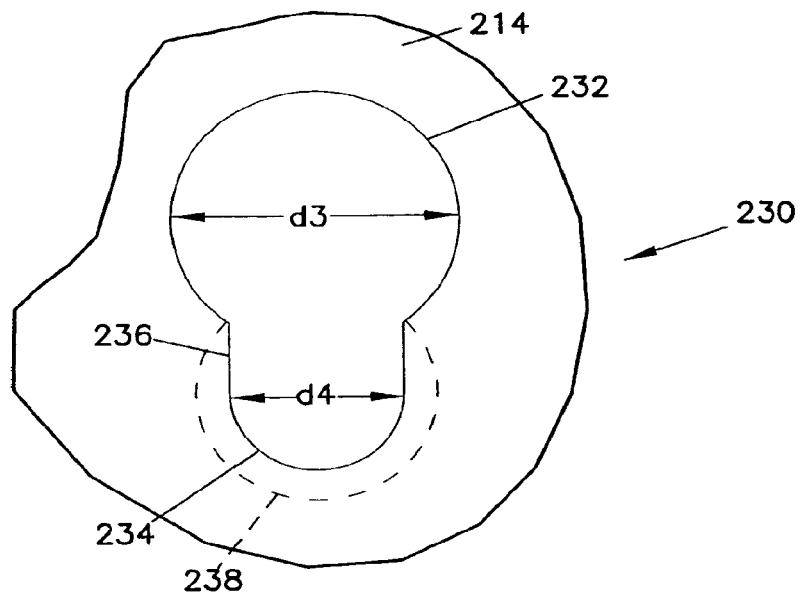
FIG. 7 is an enlarged detail view of FIG. 6.

Referring now to FIGS. 6-8, a second embodiment of the cable management assembly 210 is illustrated. In this embodiment, the panel 214 includes a second embodiment of shaped apertures 230 configured to secure the cable management devices 250.

As shown in FIG. 7, the shaped apertures 230 have a keyhole-like configuration including a first receiving aperture portion 232, a second notch aperture portion 234, and a slide aperture portion 236. The slide aperture portion 236 extends between the receiving aperture portion 232 and the notch aperture portion 234. The receiving aperture portion 232 has a first diameter d3. The notch aperture portion 234 has a second diameter d4. In this embodiment, the second diameter d4 of the notch aperture portion 234 is less than the first diameter d3 of the receiving aperture portion 232. The shaped apertures 230 are oriented and formed within the panel 14 such that the receiving aperture portion 232 is vertically aligned with the notch aperture portion 34.

Referring back to FIG. 7, the shaped apertures 230 are arranged in an array of vertical columns 240 and horizontal rows 242. In this illustrated embodiment, the panel 214 includes nine vertical columns 240 of shaped apertures 230.

The exemplary cable management device 250 of this embodiment is similar to the previous spool embodiment including a spool body 264 extending between first and second ends 266, 268 and a cable retainer 270. As shown in FIG. 8, the connection 280 of this embodiment is configured to secure the device 250 to the panel 214. In the illustrated embodiment, the connection 280 includes first and second attachments 272, 274 that correspond to the shaped apertures 230. As shown, the first and second attachments 272, 274 are protrusions or pin connections 282, 284. The first and second pin connections 282, 284 each have a primary diameter D3. The primary diameter D3 of the first and second pin connections 282, 284 corresponds to the diameter d3 of the receiving aperture portions 232 of each of the shaped apertures 230.

Each of the first and second pin connections 282, 284 also includes a neck or annular groove (e.g. 286). The grooves are located between the primary diameter (e.g. D3) of the pin connections 282, 284 and the first end 266 of the spool body 264. The grooves have an outer diameter (e.g. D4). The diameter D4 of each groove 286 is less than the primary diameter D3 of the pin connections, and corresponds to the diameter d4 of the notch aperture portion 234 of the shaped apertures 230 (FIG. 7).

Still referring to FIG. 8, the cable management device 250 is secured to the panel 214 by pushing or inserting the first and second pin connections 282, 284 of the device 250a' into the receiving aperture portions 232 of a selected first and second shaped aperture 230a, 230b. The cable management device is inserted into the shaped aperture 230 from the front side 246 of the panel 214 toward the back side 248 of the panel. The device 250 is then moved down the slide aperture portion 236 toward the notch aperture portion 234 (represented by the arrow) to a secured position, as shown by device 250a".

When the device 250 is translated downward toward the notch aperture portion 234, the panel 214 becomes engaged in the grooves of the first and second pin connections 282, 284. In other words, the cable management device 250 seats in the notch aperture portion 234, the thickness of the panel 214 being configured to fit between the primary diameter D3 of the pin connections 82, 84 and the first end 266 of the device 250. When secured in this matter, the cable management device 250 cannot be pulled or pushed out of position. Preferably the device 250 is detachably secured, i.e. can be slid vertically upward for removal.

A recess 238 (FIG. 7) can be formed on the backside of the panel 214, at least partially surrounding the notch aperture portion 234 of the shaped holes 230. The recess 238 is preferably sized and configured to receive the primary diameter D3 of the pin connections 282, 284 when the cable management device 250 is secured to the panel 214.

The groove of the first pin connection 282 couples with the notch aperture portion 234 of a first shaped aperture 230a, and the groove of the second pin connection 284 couples with the notch aperture portion 234 of a second shaped aperture 230b, when the cable management device is secured to the panel 214. In this configuration two shaped apertures 230 are used to secure the device 250 to the panel 214. The first shaped aperture 230a is positioned above the second shaped aperture 230b in a single vertical column 240 of shaped apertures.

It is contemplated that other arrangements using shaped apertures having a spacing configuration other than above/below one another can be used in accord with the principles disclosed. For example, the pin connections 282, 284 can be oriented in horizontal alignment, rather than vertical alignment, on the first end 266 of the spool body 264 such that the connection 282, 284 secure to two shaped apertures 230 in a single horizontal row; or the pin connection 282, 284 can be laterally and vertically offset to couple to shaped apertures 230 in different columns 240 and different rows 242.

Referring now to FIGS. 9-12, a third embodiment of the cable management assembly 310 is illustrated. In this embodiment, the panel 314 includes a third embodiment of shaped apertures 330 configured to secure the cable management devices 350.

Figure 10:
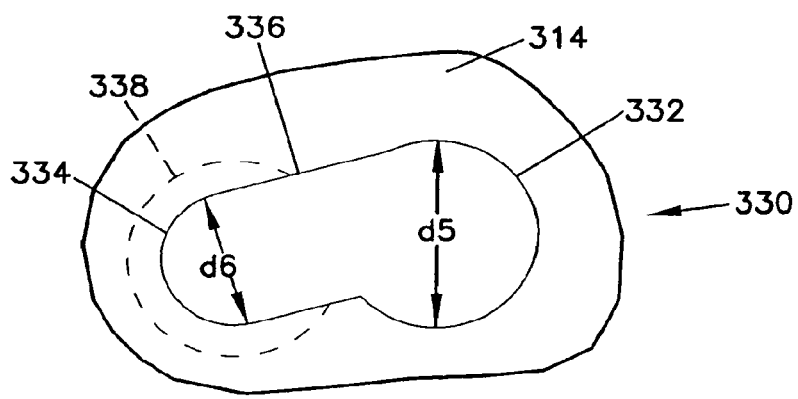
FIG. 10 is an enlarged detail view of FIG. 9.

Similar to the first embodiment, the shaped apertures 330 of FIG. 10 include a first receiving aperture portion 332, a second notch aperture portion 334, and a slide aperture portion 336. The slide aperture portion 336 extends between the receiving aperture portion 332 and the notch aperture portion 334. The receiving aperture portion 332 has a first diameter d5. The notch aperture portion 334 has a second diameter d6. In this embodiment, the second diameter d6 of the notch aperture portion 334 is less than the first diameter d5 of the receiving aperture portion 332. The shaped apertures 330 are oriented and formed within the panel 314 such that the receiving aperture portion 332 is vertically located above, and laterally offset from, the notch aperture portion 334.

Similar to the previous embodiment, the shaped apertures 330 are arranged in an array of vertical columns 340 and horizontal rows 342. In viewing the embodiment in FIG. 9, the shaped apertures 330 of the most rightward vertical column 340 slants downward toward the right, from the receiving aperture portion 332 to the notch aperture portion 334. The shaped apertures 330 of the remaining four vertical columns 340 slant downward toward the left.

Figure 12:
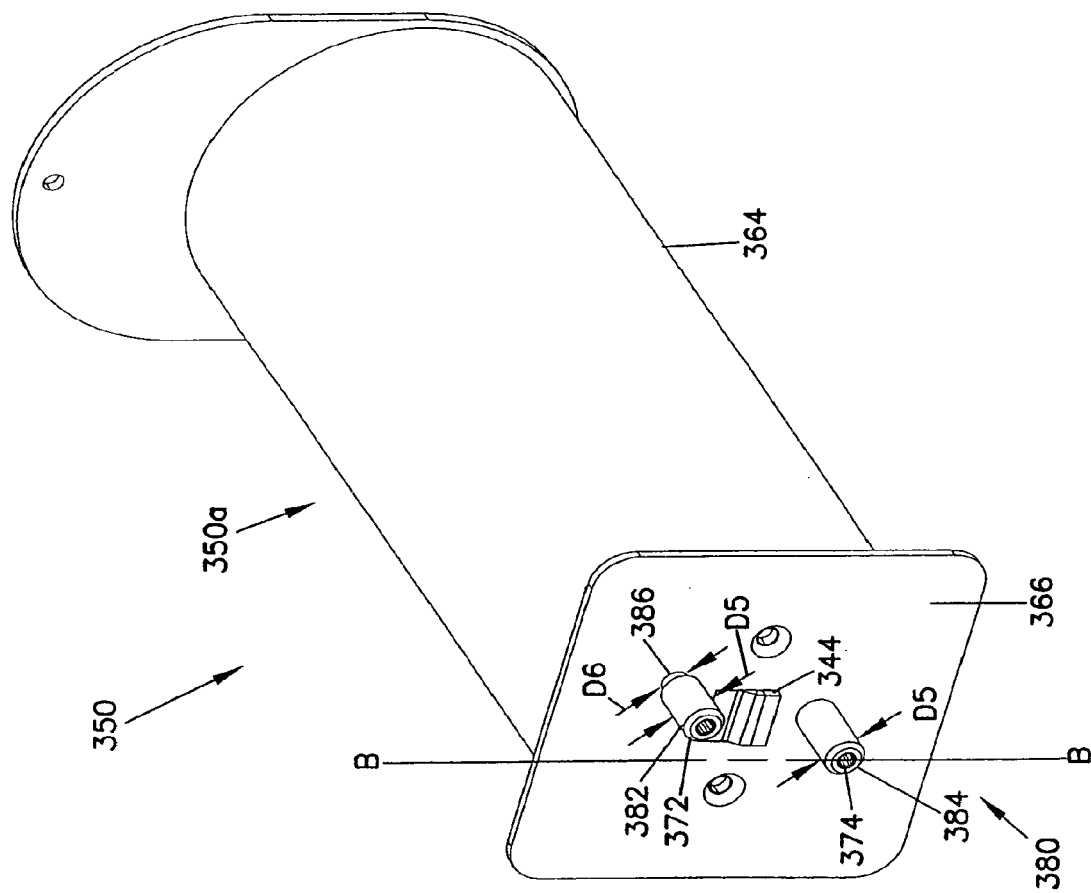
FIG. 12 is a rear perspective view of one embodiment of a cable management device shown in FIG. 9.

Referring now to FIG. 12, the connection 380 of the illustrated cable management device embodiment 350 is also configured to secure the device 350 to the panel 314. The connection 380 includes first and second attachments 372, 374 that correspond to the shaped apertures 330 shown in FIGS. 9 and 10. As shown in FIG. 12, the first and second attachments 372, 374 are protrusions or pin connections 382, 384 positioned in a laterally offset orientation to one another (as represented by axis B-B). The first and second pin connections 382, 384 each have a primary diameter D5. The primary diameter D5 of the first and second pin connections 382, 384 corresponds to the diameter d5 of the receiving aperture portions 332 of each of the shaped apertures 330.

The first pin connection 382 in the illustrated embodiment includes a neck or annular groove 386. The groove 386 is located between the primary diameter D5 of the first pin connection 382 and the first end 366 of the spool body 364. The groove 386 has an outer diameter D6. The outer diameter D6 of the groove is less than the primary diameter D5, and corresponds to the diameter d6 of the notch aperture portion 334 of the shaped aperture 330.

FIG. 11 illustrates the installation of this cable management device. An upper device 350a' is shown partially mounted to the panel 314; a lower device 350a" is shown secured to the panel 314. In use, the cable management devices 350 are secured to the panel 314 by pushing or inserting the first and second pin connections 382, 384 of the device 350a into the receiving aperture portions 332 of a selected first and second shaped aperture 330a, 330b. The cable management device is inserted into the shaped aperture 330 from the front side 346 of the panel 314 toward the back side 348 of the panel. The device 350a is then twisted or rotated (as represented by the arrow) to a secured position, as illustrated by device 350b.

When the device 350 is rotated, the groove 386 of the first pin connection 382 slides along the slide aperture portion 336 of the shaped aperture 330. Because of the larger sized primary diameter D5 of the second pin connection 384, the second pin connection 384 remains fixed (i.e. does not translate, but does rotate) within the receiving aperture portion 334. The device 350 continues to rotate until the groove 386 of the first pin connection 382 reaches the notch aperture portion 334 (see device 350b). In this position, the panel is engaged in the groove 386 of the first pin connection 382 between the primary diameter D5 of the pin connection 382 and the first end 366 of the device 350. When secured in this matter, the device 350 cannot be pulled or pushed out of position. Preferably the device 350 is detachably secured, i.e. can be rotated in an opposite direction for removal.

The cable management device 350 illustrated in FIGS. 9-12 includes a flexible tensioning tab 344 (FIG. 12). The flexible tensioning tab 344 extends outwardly from the first end 366 of the device 350 and contacts the riser or panel 314 when the cable management device 350 is secured to the panel 314. The flexible tensioning tab 344 places the pin connections 382, 384 in tension to assist in maintaining a secure engagement between the device and the panel.

As shown in FIG. 11, a recess 338 can be formed on the backside of the panel 314, at least partially surrounding the notch aperture portion 334 of the shaped holes 330. The recess 338 is preferably sized and configured to receive the primary diameter D5 of the pin connections 382, 384 when the cable management device 50 is secured to the panel 314. The recesses 338 assist in structurally supporting the pin connections 382, 384 of the cable management device 350.

The groove 386 of the first pin connection 382 couples with the notch aperture portion 334 of the first shaped aperture 330*a* and the second pin connection 384 couples with the receiving aperture portion 332 of the second shaped aperture 330*b* when the cable management device is secured to the panel 314. In this configuration, two shaped apertures 330 are used to secure the device 350 to the panel 314. The first shaped aperture 330*a* is positioned above the second shaped aperture 330*b* in a single column 340 of shaped apertures. It is contemplated that other arrangements using shaped apertures having a spacing configuration other than above/below one another can be used in accord with the principles disclosed.

As can be understood with regards to the first and third embodiments herein disclosed, the shaped apertures (e.g. 30, 330) in the outermost vertical columns (e.g. 40, 340) are oppositely oriented. This is to permit, for example, a user to position a cable management device (e.g. 50, 350) in either the leftmost column or the rightmost column and slide or rotate the device toward the center of the panel to avoid interference with the rack 12.

Figure 13:
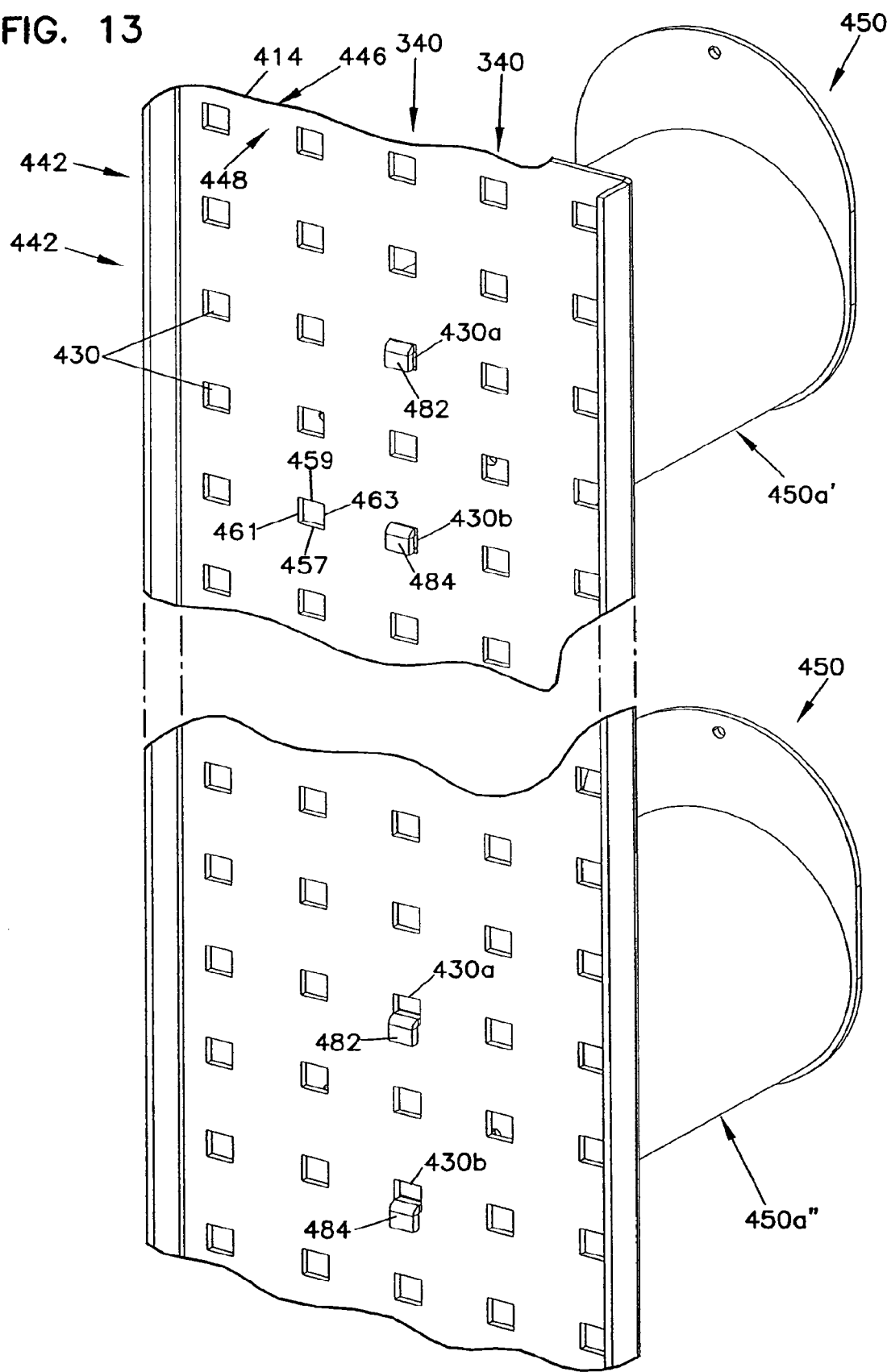
FIG. 13 is an enlarged rear perspective view of yet another embodiment of a cable management assembly shown in FIG. 1.
Figure 14:
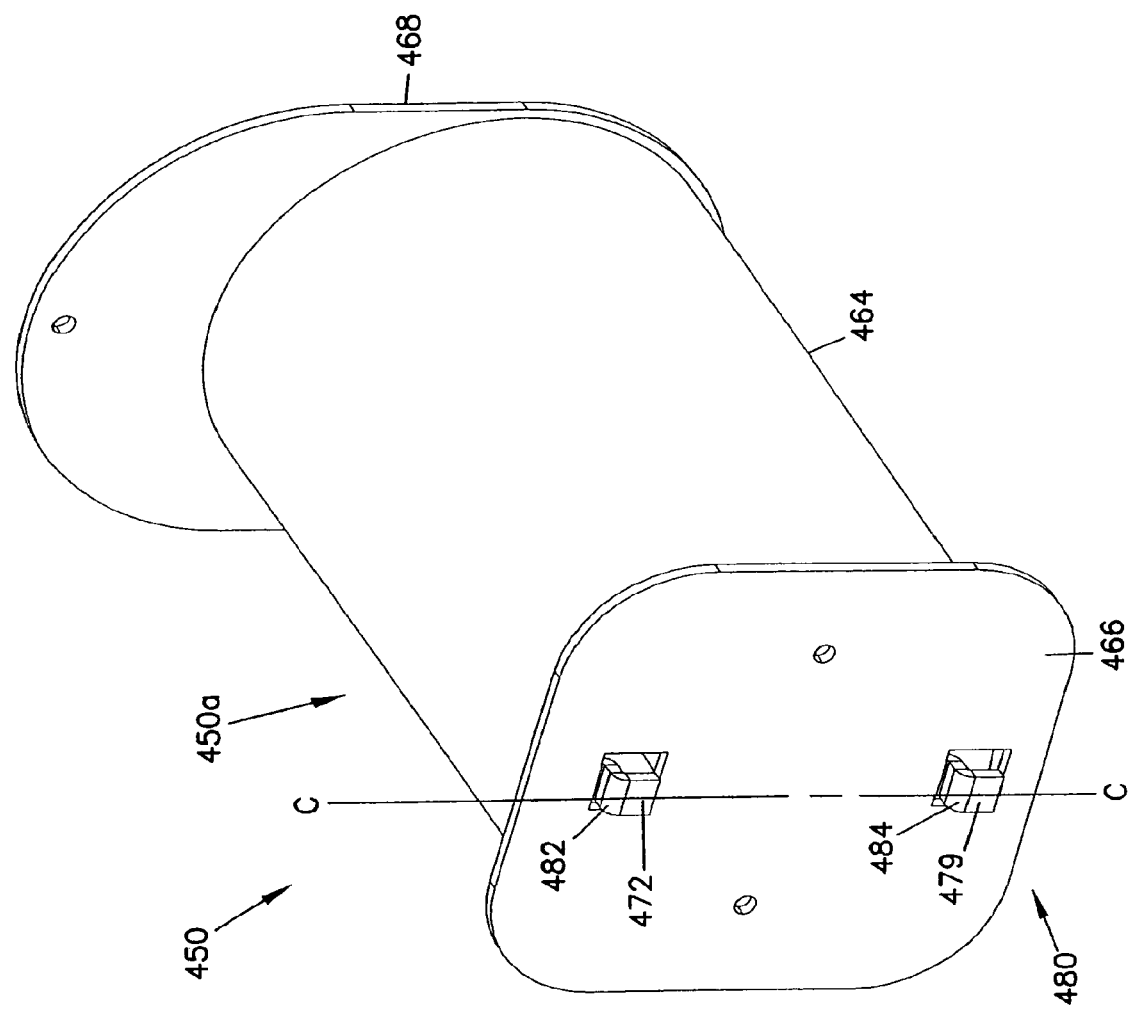
FIG. 14 is an enlarged rear perspective view of the cable management assembly shown in FIG. 13.

Referring now to FIGS. 13 and 14, yet another embodiment of the cable management assembly 410 is illustrated. In this fourth embodiment, the panel 414 includes another embodiment of shaped apertures 430 configured to secure the illustrated cable management devices 450. In this embodiment, the shaped apertures 430 include first and second opposing edges 457, 459 and third and fourth opposing edges 461, 463. In the illustrated embodiment the edges define a square shaped aperture 430. Other geometrically shaped apertures, such as rectangular shaped apertures, are contemplated. Similar to the previous embodiments, the shaped apertures 430 are arranged in an array of vertical columns 440 and horizontal rows 442.

Referring to FIG. 13, the connection 480 of the cable management device 450 is also configured to secure the device 450 to the panel 414. The cable management device 450 is a spool device 450*a* including a first end 466 and a second end 468. A spool body 464 extends between the first and second ends 466, 468. The connection 480 includes first and second attachments 472, 474 that correspond to the shaped apertures 430. The first and second attachments 472, 474 include hooked connections 482, 484 positioned in an aligned orientation to one another (as represented by axis C-C).

In use, the cable management device 450 is secured to the panel 414 by inserting the first and second hooked connections 482, 484 of the device 450*a'* into selected first and second shaped apertures 430*a*, 430*b*. The cable management device is inserted into the shaped apertures the front side 446 of the panel 414 toward the back side 448 of the panel. The device 450 is then hooked over the first edge 457 that partially defines the shaped aperture 430 in the panel 414. When secured in this matter, the device 450*a"* cannot be pulled or pushed out of position. Preferably the device 550 is detachably secured, i.e. can be lifted from the first edge 457 for removal.

In this configuration two shaped apertures 430 are used to secure the device 450 to the panel 414. The first shaped aperture 430*a* is positioned above the second shaped aperture 430*b* in a single column 440 of shaped apertures. It is contemplated that other arrangements using shaped apertures having a spacing configuration other than directly above/below one another can be used in accord with the principles disclosed.

Figure 15:
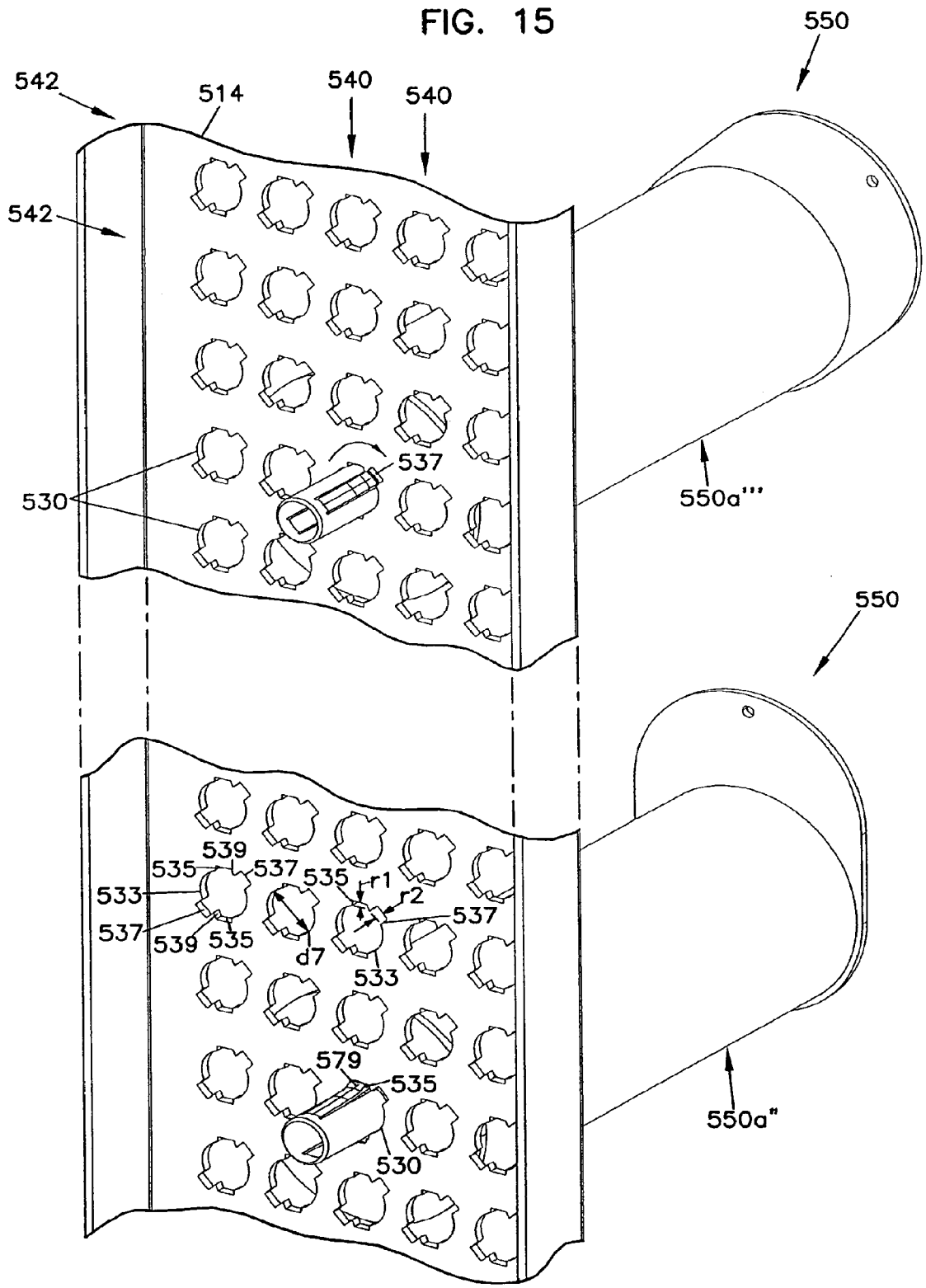
FIG. 15 is an enlarged rear elevational view of still another embodiment of a cable management assembly shown in FIG. 1.
Figure 16:
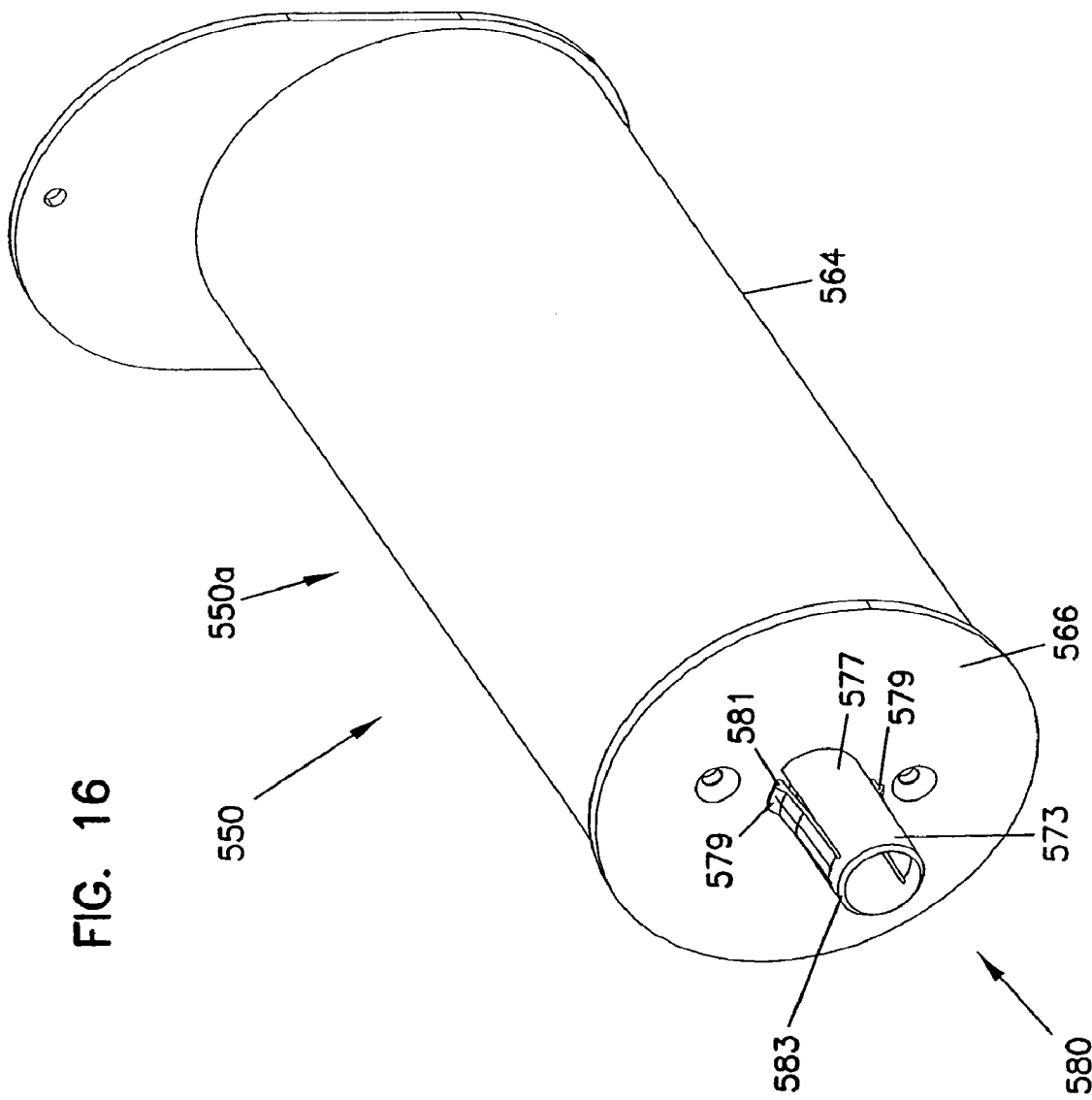
FIG. 16 is a rear perspective view of one embodiment of a cable management device that can be used with the cable management assembly shown in FIG. 15.

Referring now to FIGS. 15 and 16, a fifth embodiment of the cable management assembly 510 is illustrated. In this embodiment, the panel 514 includes still another embodiment of shaped apertures 530 configured to secure the cable management devices 550.

The shaped apertures 530 include a primary aperture portion 533, a pair of insertion notches 535, and a pair of release notches 537. A ramped surface 539 interconnects the insertion notches 535 and the release notches 537. The primary aperture portion 533 has a first diameter d7. The pairs of insertion notches and release notches 535, 537 extend radially outwardly from the primary aperture portion 533 a distance r1, r2. The distance r2 that the release notches 537 extend from the primary aperture portion 533 is greater than the distance r1 that the insertion notches 537 extend from the primary aperture portion 533. The shaped apertures 530 are arranged in an array of vertical columns 540 and horizontal rows 542.

Referring now to FIG. 16, the connection 580 of the cable management device embodiment 550 is also configured to secure the device 550 to the panel 514. The connection 580 of this spool device 550*a* includes a first attachment 573 that corresponds to the shaped apertures 533 shown in FIG. 15. As shown in FIG. 16, the first attachment 573 is a snap-in protrusion or connection 583 centrally positioned at the first end 566 of the spool body 564. The first snap-in connection 583 includes a pin body 577 with flexible tabs 579.

In use, the cable management device 550*a"* (FIG. 15) is secured to the panel 514 by aligning the flexible tabs 579 of the device with the insertion notches 535 of a selected shaped aperture 530, and pushing or inserting the first snap-in connection 583 of the device 550*a"* into the shaped aperture 530. The cable management device is inserted into the shaped aperture 530 from the front side 546 of the panel 514 toward the back side 548 of the panel. The flexible tabs 579 of the device 550 flex inward during insertion and snap outward when an edge 581 passes through the insertion notch 535 of the shaped aperture 530. The panel 514 is then secured between the first end 566 of the device 550 and the edge 581 of the connection 580. When secured in this matter, the device 550 cannot be pulled or pushed out of position. In this configuration, only one shaped aperture 530 is used to secure the device 550 to the panel 514.

Preferably the device 550 is detachably secured. In particular, the device 550 can be removed by rotating the device 550*a'''* within the shaped aperture 530 (as shown by the arrow). As the device is rotated, the flexible tabs 579 contact the ramped surfaces 539 of the shaped aperture 530. The ramped surfaces 539 push or flex the tabs 579 inward as the device is rotated. When the tabs are aligned with the release notches 537, the tabs snap outward. The release notches are sized and configured so that the tabs 579, and the device 550, can be removed by pulling the device outward through the release notches 537.

As can be understood with regards to all embodiments, the panel (e.g. 14) of the presently disclosed embodiments can include a single panel construction that extends along the vertical length of the racks 12, as shown in FIG. 1. In an alternative embodiment, as shown in FIG. 2, the panel can include one or more sections 28 that form the panel 14. The panel 14 includes a length L and a width W (FIG. 1). In the illustrated embodiments, the length L of the panel 14 extends substantially from the top of the rack 12 to the bottom of the rack. In other embodiments, the panel may only extend partially along the height of the rack 12.

The width W of the panel 14 is configured to extend between a gap in the racks 12. The width W of the panel 14 can be within the range of 2 inches to 18 inches, inclusively. Preferably the width W of the panel is between about 5 inches and 12 inches.

FIG. 17 illustrates some of a variety of cable management devices 50 that can be used in accord with the principles disclosed. The spool 50a is one of the cable management devices 50, previously described in detail. The spools can be of varying sizes and may be used to wrap and hold excess cabling. Other cable management devices 50 can include, for example, cable guides 50b that contain or guide cabling; tie-off brackets 50c to which cabling can be secured; finger devices or edge protections 50d to organize and protect cable that is routing between the panel 14 and components mounted on the telecommunications racks 12 (FIG. 1); channel guides 50e that contain cabling; and radius limiters 50f configured to limit the bend radius of stored cabling. Further, other types of cable management devices 50 may include cable termination devices (not shown) for terminating fiber optic or ribbon cables at the panel 14, or flip-out trays (not shown) to store cabling slack.

As shown in FIG. 17, the cable management devices 50 and the panels 14 are configured to permit a user to position any of the different cable management device 50 at any location on the panel 14 of the cable management assembly 10. In this illustration, the second panel embodiment 214 is illustrated, however, it is to be understood that this illustration encompasses the principles of each of the disclosed panel embodiments and associated devices.

The devices 50 can be placed at any placement coordinate on the panel 14. In addition, the devices can also be positioned in various orientations, such as illustrated by the opposing radius limiters 50f oriented one-hundred and eighty degrees relative to one another. By this, a user may select one or more devices from a library of devices and position the devices as desired to configure the system to meet a particular need.

Referring now to FIG. 18, another embodiment of the cable management system 100' is illustrated. In this embodiment, the cable management assembly 10' includes an end-rack panel 14' having first, second and third interface portions 16a, 16b, 16c. In this embodiment, the end-rack panel 14' is mounted to columns 104, 108 of a single standing telecommunications rack 12, or to an end column (104 or 108) of a telecommunications rack located at the end of a series of racks.

The end-rack panel 14' provide a user with three interface portions 16a-c having a plurality of discrete openings (not shown for purposes of clarity) to which various cable management devices 50 can be detachably secured. Preferably the discrete openings include shaped apertures. The three interface portions 16a-c in the illustrated embodiment form a channel-like configuration. Large cables can be routed through this channel-like configuration through a top or bottom opening 96, 98. Large access holes (not shown) can be formed in the end-rack panel 14' through which cabling can be routed.

The cable management system 100' of FIG. 18 is illustrated with various cable management devices, such as spools 50a and cable channel guides 50e. FIG. 18 also illustrates some additional cable management devices that can be used with the cable management assemblies 10, 10' disclosed, including a cable retainer 50g and another embodiment of a radius limiter or edge protector 50h.

The above specification provides a complete description of the cable management assembly, system, and method. Since many embodiments of the invention can be made without departing from the spirit and scope of the invention, the invention resides in the claims hereinafter appended.

What is claimed is:

1. A cable management assembly, comprising:
  a) a panel including a front interface portion having a width and a length, the interface portion having shaped apertures aligned in columns and rows, the columns and rows of shaped apertures defining a repeating pattern that extends along a majority of the length and across a majority of the width of the front interface portion, the rows of shaped apertures including rows of square apertures, the panel further including flanges oriented perpendicular to the front interface portion, the flanges defining holes for mounting the panel to a telecommunications panel; and
  (b) a plurality of cable management devices each having integral attachments, the integral attachments including first and second hooks arranged to engage two separate square apertures of the pattern;
  (c) wherein the cable management devices secure to the interface portion by only the integral attachments, and wherein the cable management devices are removable from the interface portion without the use of a tool, and without having to access a backside of the panel;
  (d) wherein the plurality of cable management devices includes different types of cable management devices including:
    (i) at least one cable guide including a plurality of projecting cable management fingers arranged vertically;
    (ii) at least one cable channel guide defining a vertical cable channel; and
    (iii) at least one cable radius limiter defining a half cylindrical surface configured to limit the bend radius of stored cabling.

2. The cable management assembly of claim 1, wherein the width of the panel is between 2 and 18 inches.

3. The cable management assembly of claim 2, wherein the width of the panel is between 5 and 12 inches.

4. The cable management assembly of claim 1, wherein the square apertures that receive the first and second hooks are located in different rows.

5. The cable management assembly of claim 1, wherein the pattern includes columns and rows of square-shaped apertures.

6. The cable management assembly of claim 1, wherein the cable management devices includes a spool.

* * * * *